United States Patent
Matsumoto et al.

(10) Patent No.: US 10,443,386 B2
(45) Date of Patent: Oct. 15, 2019

(54) AUTOMATED CERAMIC MATRIX COMPOSITE PLY LAYUP

(71) Applicant: General Electric Company, Schenectady, NY (US)

(72) Inventors: Roger Lee Ken Matsumoto, Newark, DE (US); Nitin Garg, Arlington, VA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/146,132

(22) Filed: May 4, 2016

(65) Prior Publication Data

US 2017/0320785 A1   Nov. 9, 2017

(51) Int. Cl.
| | |
|---|---|
| *C04B 37/00* | (2006.01) |
| *B32B 18/00* | (2006.01) |
| *F01D 5/02* | (2006.01) |
| *C04B 35/71* | (2006.01) |
| *C04B 35/626* | (2006.01) |
| *C04B 35/634* | (2006.01) |
| *F01D 5/28* | (2006.01) |
| *C04B 35/00* | (2006.01) |
| *C04B 35/80* | (2006.01) |

(52) U.S. Cl.
CPC ............... *F01D 5/02* (2013.01); *B32B 18/00* (2013.01); *C04B 35/6263* (2013.01); *C04B 35/6264* (2013.01); *C04B 35/6342* (2013.01); *C04B 35/71* (2013.01); *C04B 37/001* (2013.01); *F01D 5/282* (2013.01); *F01D 5/284* (2013.01); *C04B 35/806* (2013.01); *C04B 2235/606* (2013.01); *C04B 2237/365* (2013.01); *C04B 2237/38* (2013.01); *F05D 2230/20* (2013.01); *F05D 2230/31* (2013.01); *F05D 2300/20* (2013.01); *F05D 2300/6033* (2013.01); *Y02T 50/672* (2013.01); *Y02T 50/673* (2013.01)

(58) Field of Classification Search
CPC ..... C04B 41/0072; C04B 35/71; C04B 35/80; C04B 35/803; C04B 35/806; C04B 37/001; C04B 37/38; F01D 5/02
See application file for complete search history.

(56) References Cited

U.S. PATENT DOCUMENTS

| | | | |
|---|---|---|---|
| 5,015,540 A | 5/1991 | Borom et al. | |
| 5,154,787 A * | 10/1992 | Gardner | ............... C04B 35/634 156/166 |
| 5,330,854 A | 7/1994 | Singh et al. | |
| 5,336,350 A | 8/1994 | Singh | |
| 5,628,938 A | 5/1997 | Sangeeta et al. | |
| 5,714,025 A * | 2/1998 | Brungardt | ............... B32B 18/00 156/89.11 |

(Continued)

*Primary Examiner* — Alex B Efta
(74) *Attorney, Agent, or Firm* — Dority & Manning, P.A.

(57) ABSTRACT

Methods for forming ceramic matrix composite (CMC) components are provided. In one exemplary embodiment, a method comprises automatically laying up CMC plies. Laying up plies includes transferring a CMC ply to a layup tool; applying heat to the CMC ply; and stacking the CMC ply with at least one other CMC ply. In various embodiments, CMC plies may be laid up using an automated machine. In some embodiments, a CMC ply may be transferred to a layup tool using an automated machine and the CMC ply may be stacked with at least one other CMC ply using the automated machine.

20 Claims, 7 Drawing Sheets

(56) References Cited

U.S. PATENT DOCUMENTS

| | | | |
|---|---|---|---|
| 6,024,898 A | | 2/2000 | Steibel et al. |
| 6,096,164 A | * | 8/2000 | Benson ................ B29C 53/602 |
| | | | 156/425 |
| 6,258,737 B1 | | 7/2001 | Steibel et al. |
| 6,379,763 B1 | * | 4/2002 | Fillman .................... B32B 1/08 |
| | | | 138/121 |
| 6,403,158 B1 | | 6/2002 | Corman |
| 6,503,441 B2 | | 1/2003 | Corman et al. |
| 7,080,441 B2 | | 7/2006 | Braun |
| 7,083,698 B2 | | 8/2006 | Engwall et al. |
| 2004/0067316 A1 | | 4/2004 | Gray et al. |
| 2010/0081556 A1 | * | 4/2010 | Heng ................ A61C 13/0022 |
| | | | 501/89 |
| 2015/0328799 A1 | * | 11/2015 | Szweda ................ C04B 35/117 |
| | | | 156/510 |

\* cited by examiner

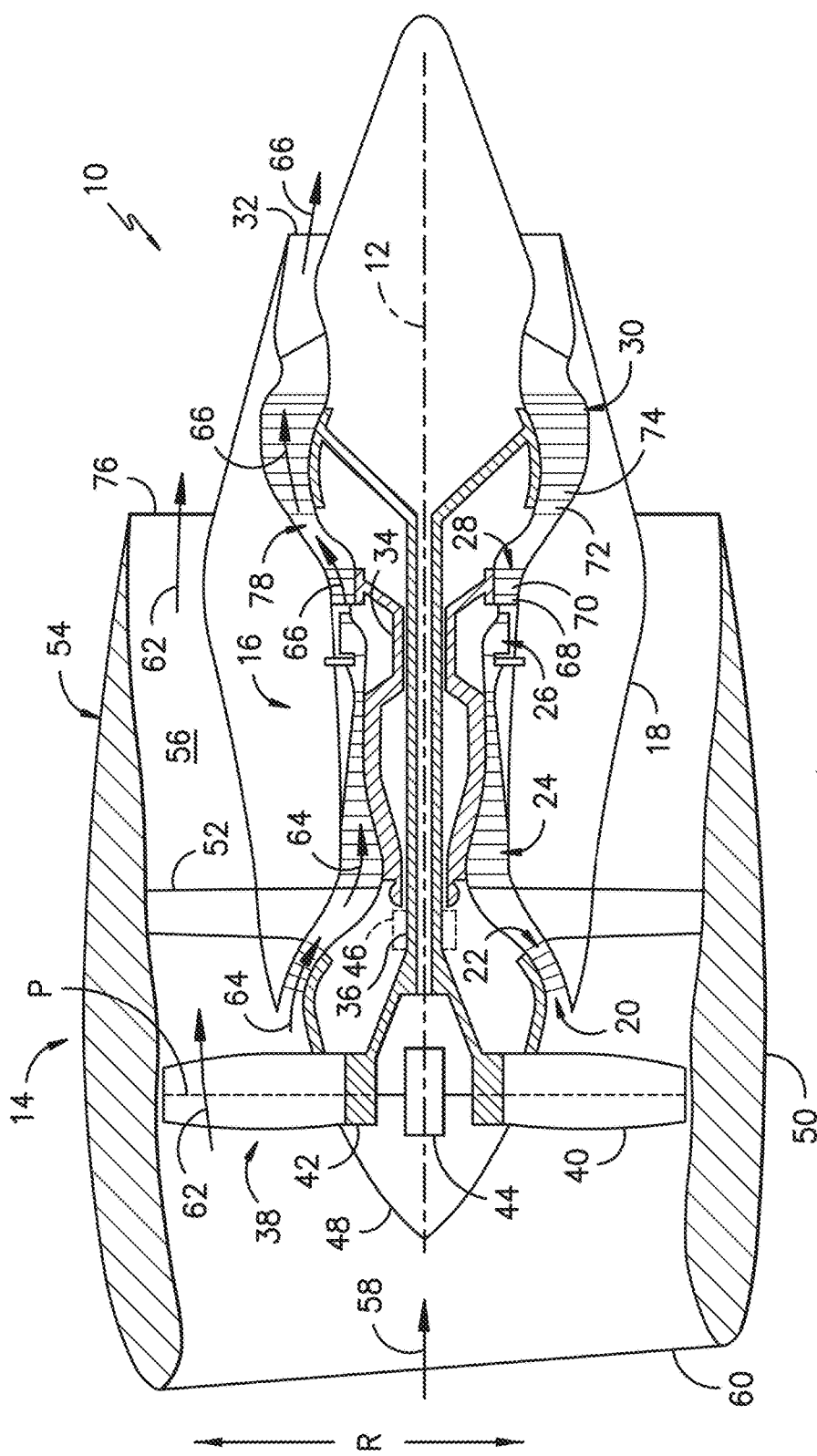
FIG. -1-

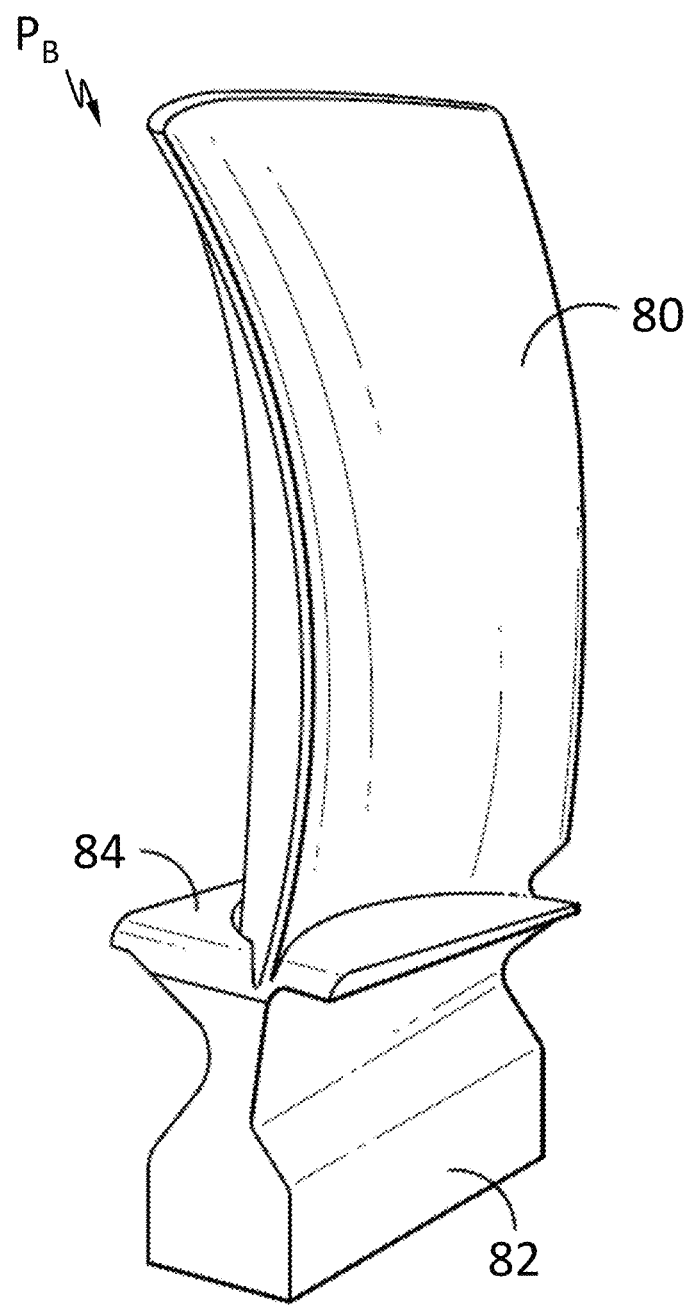
FIG. -2-

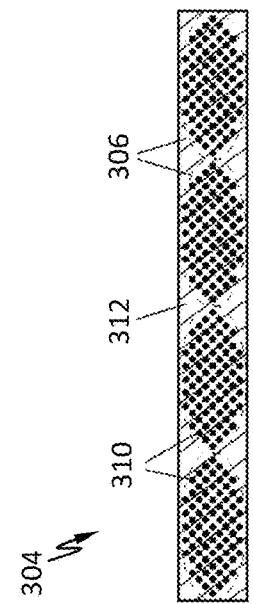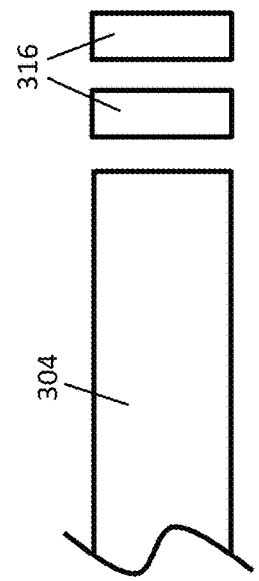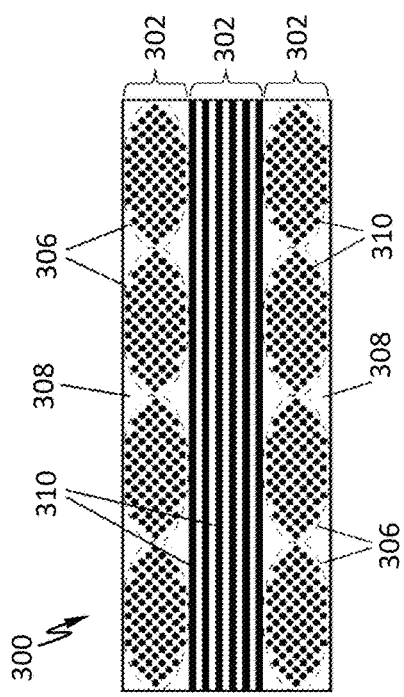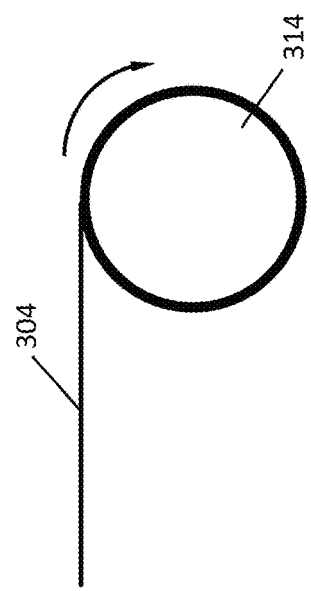
FIG. -3B-
FIG. -3D-
FIG. -3A-
FIG. -3C-

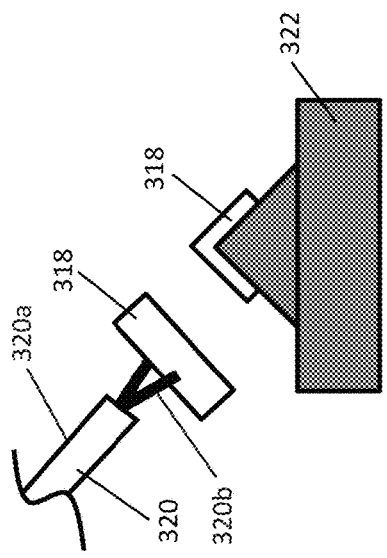
*FIG. -3E-*
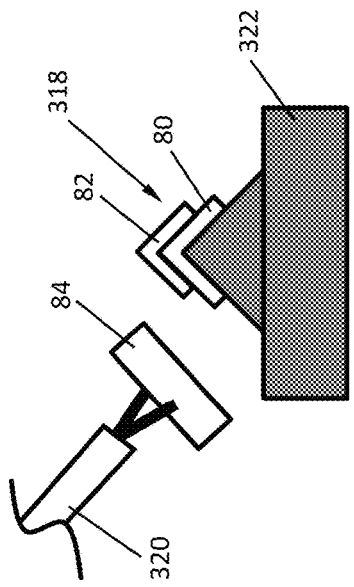
*FIG. -3F-*
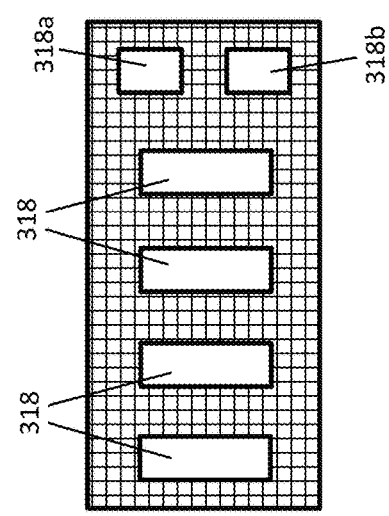
*FIG. -3G-*
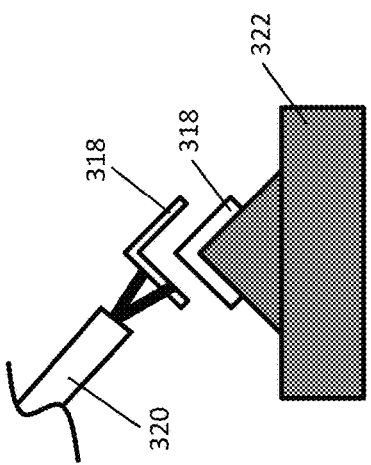
*FIG. -3H-*

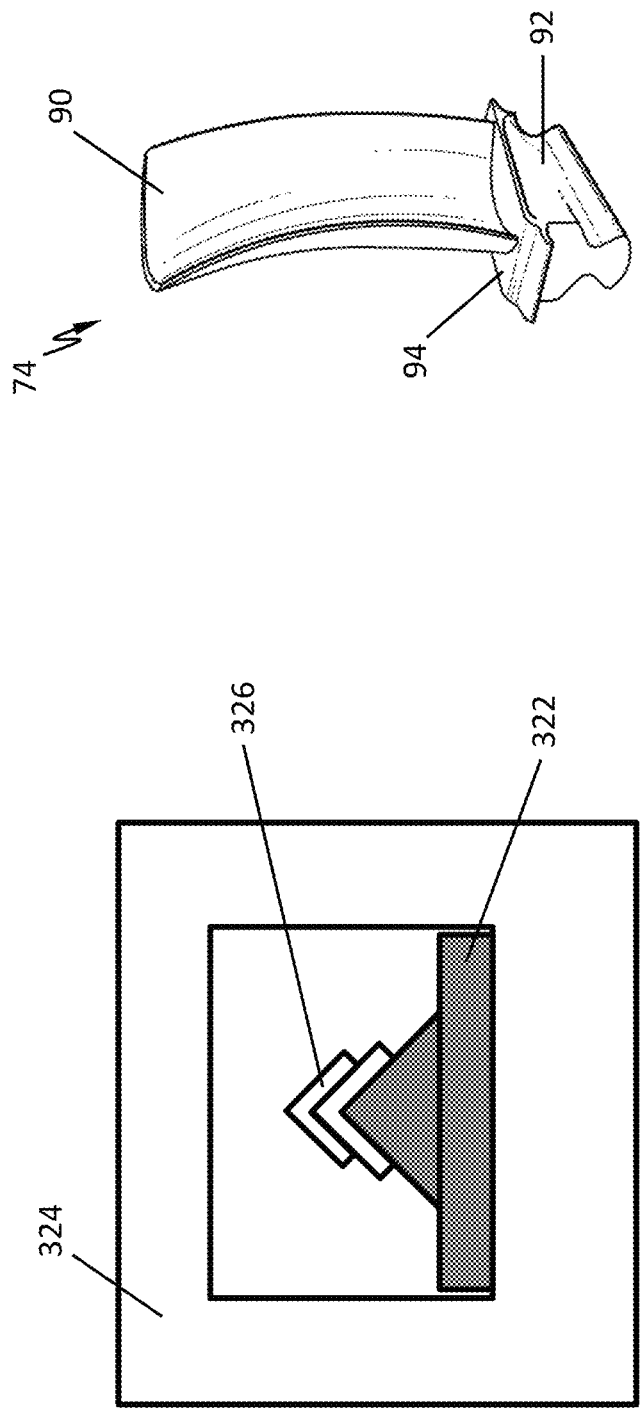

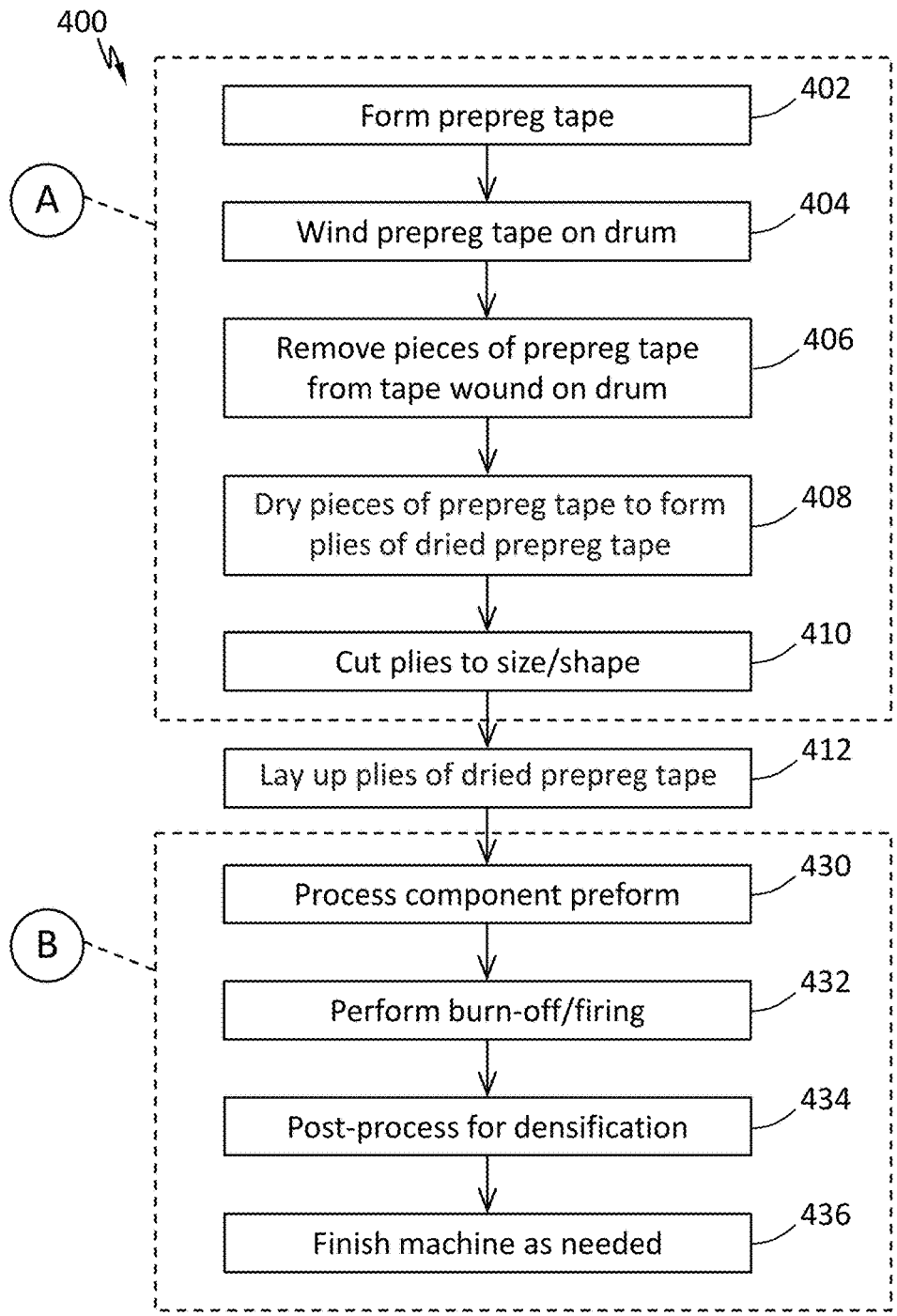
FIG. - 4A -

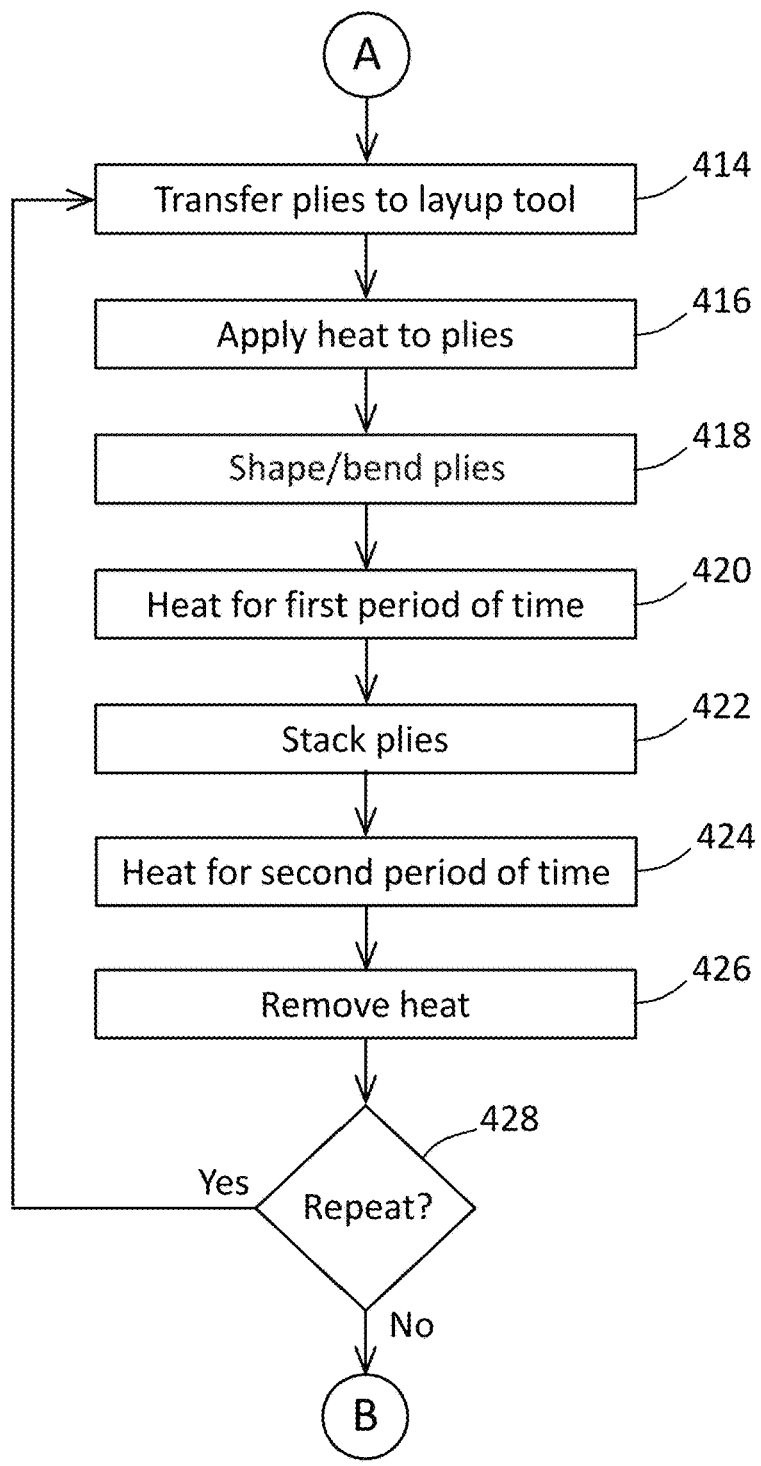
FIG. - 4B -

AUTOMATED CERAMIC MATRIX COMPOSITE PLY LAYUP

FIELD OF THE INVENTION

The present subject matter relates generally to ceramic matrix composite components. More specifically, the present subject matter relates to processes for forming ceramic matrix composite components, in particular, ceramic matrix composite components of gas turbine engines.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

In general, turbine performance and efficiency may be improved by increased combustion gas temperatures. However, increased combustion temperatures can negatively impact the gas turbine engine components, for example, by increasing the likelihood of material failures. More commonly, non-traditional high temperature materials, such as ceramic matrix composite (CMC) materials, are being used for various components within gas turbine engines. Because CMC materials can withstand relatively extreme temperatures, there is particular interest in replacing components within the flow path of the combustion gases with CMC components, i.e., components formed from CMC materials. Thus, turbine performance and efficiency can be improved through the use of CMC components.

Examples of CMC materials, and particularly SiC/Si—SiC (fiber/matrix) continuous fiber-reinforced ceramic composite (CFCC) materials and processes, are disclosed in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, each in the form of a "tape" comprising the desired ceramic fiber reinforcement material, one or more precursors of the CMC matrix material, and organic resin binders. According to conventional practice, prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. The resulting prepreg tape may be laid-up with other tapes, and then debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials.

Conventional slurries often require solvents in amounts of about 50 weight percent or more to yield tapes that are workable as a result of containing a sufficient amount of solvent, e.g., about 10 to about 20 weight percent solvent. However, typical solvents, including toluene and MIBK, are toxic and flammable, necessitating careful processing, handling, and shipping of the slurries and tapes. In addition, burn-off of typical solvents during firing of the preform results in dimensional changes that interfere with the ability to produce CMC components of consistent dimensions. Moreover, plies produced from tapes using conventional slurries typically are laid up manually, i.e., by hand, and such layups are prone to out-of-alignment plies and ergonomic issues for the assembler. Additionally, manual layups usually result in a large degree of bulk, which can lead to gaps between plies that reduce the material properties of the resulting component.

U.S. Patent Application Publication No. 2013/0157037 describes compositions and processes for producing composite articles, and more specifically, slurry and prepreg tape compositions that are safer to process, handle, and transport, as well as capable of achieving greater dimensional consistency during processing to produce composite articles. In particular, the slurry composition contains particles of a precursor that converts to a ceramic material when heated to a firing temperature, at least one binder that is capable of adhering the particles of the ceramic precursor together to form a flexible prepreg tape, at least one liquid plasticizer, and a solvent in which the binder is dissolved. The solvent is sufficiently volatile to evaporate from the slurry composition during forming of the tape so that the tape contains less than ten weight percent of the solvent, yet the tape is also flexible as a result of the slurry composition containing a sufficient amount of the liquid plasticizer. Using slurry and prepreg tape compositions such as those described in U.S. Pub. No. 2013/0157037, CMC plies may be produced that contain, in addition to the ceramic fibers in the tow and solid particulates in the matrix that will become part of the final material, minimal to no solvents and a binder system that is substantially dry at room temperature but tacky and adhesive at elevated temperatures. Because the tackiness and adhesiveness is reduced or disappears at lower temperatures, manipulation of such dried plies can be automated. Automation of ply layup can reduce or eliminate misaligned plies, eliminate ergonomic issues related to manual layup, and reduce bulk during layup.

Therefore, improved methods for forming ceramic matrix composite components would be desirable. In particular, an automated method of laying up CMC plies would be beneficial. Moreover, a method for forming CMC components using dried pre-impregnated tapes would be desirable. Further, a method for forming CMC components including mechanically transferring and/or positioning plies during ply layup would be advantageous. Additionally, a CMC component formed from an automated ply layup process would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present subject matter, a method for forming a ceramic matrix composite (CMC) component is provided. The method comprises automatically laying up CMC plies. Laying up plies includes transferring a CMC ply to a layup tool; applying heat to the CMC ply; and stacking the CMC ply with at least one other CMC ply.

In another exemplary embodiment of the present subject, a method for forming a CMC component is provided. The method comprises laying up CMC plies using an automated machine. Laying up CMC plies includes transferring a CMC ply to a layup tool; applying heat to the CMC ply; heating the CMC ply for a first period of time; stacking the CMC ply with at least one other CMC ply; and heating the stacked CMC plies for a second period of time.

In still another exemplary embodiment of the present subject matter, a method for forming a CMC component is provided. The method comprises laying up CMC plies. Laying up CMC plies includes transferring a CMC ply to a layup tool using an automated machine; applying heat to the CMC ply; heating the CMC ply for a first period of time; stacking the CMC ply with at least one other CMC ply using the automated machine; and heating the stacked CMC plies for a second period of time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-sectional view of an exemplary gas turbine engine according to various embodiments of the present subject matter.

FIG. 2 provides a side perspective view of a turbine rotor blade according to an exemplary embodiment of the present subject matter.

FIGS. 3A through 3J provide a schematic representation of a method for forming a ceramic matrix composite component for a gas turbine engine, according to an exemplary embodiment of the present subject matter.

FIG. 4A provides a chart illustrating a method for forming a ceramic matrix composite component for a gas turbine engine, according to an exemplary embodiment of the present subject matter.

FIG. 4B provides a chart illustrating a portion of the method of FIG. 4A in greater detail.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a variable pitch fan 38 having a plurality of fan blades 40 coupled to a disk 42 in a spaced apart manner. As depicted, fan blades 40 extend outward from disk 42 generally along the radial direction R. Each fan blade 40 is rotatable relative to disk 42 about a pitch axis P by virtue of the fan blades 40 being operatively coupled to a suitable actuation member 44 configured to vary the pitch of the fan blades 40. Fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth. CMC materials may be used for various components of the engine, for example, airfoils in the turbine, compressor, and/or fan regions, as well as shrouds, liners, or other components of the engine.

Referring now to FIG. 2, a side, perspective view of a CMC component preform is provided according to an exemplary embodiment of the present subject matter. The component preform is formed from a plurality of plies of a CMC material generally in a shape or contour of the resultant CMC component. In the exemplary embodiment of FIG. 2, the CMC component is a turbine rotor blade, such that FIG. 2 illustrates an exemplary CMC rotor blade preform $P_B$ comprising an airfoil portion formed from airfoil plies 80, a dovetail portion formed from dovetail plies 82, and a platform portion formed from platform plies 84. As described below, CMC blade preform $P_B$ may be processed, fired, post-processed, and machined as needed to form a finished CMC rotor blade (FIG. 3J). It will be appreciated that CMC blade preform $P_B$ is provided by way of example only. In other embodiments, the CMC component may be another component of engine 10, e.g., a stator vane, nozzle, shroud, or other appropriate component of engine 10, such that the preform is a CMC vane preform, CMC nozzle preform, CMC shroud preform, etc.

FIGS. 3A through 3J and FIGS. 4A and 4B provide schematic illustrations and flow charts of a method for forming a CMC component of a gas turbine engine, according to an exemplary embodiment of the present subject matter. Referring to FIG. 3A, the CMC component 300 preferably is a CFCC component, though other types of CMC materials also may be used, that is formed from layers or lamina 302 of a tape 304 (FIG. 3B) that comprises a fiber reinforcement material 306 impregnated with a slurry composition containing a powder comprising particles of at least one precursor, at least one binder, at least one liquid plasticizer, and a solvent in which the binder is dissolved. As such, tape 304 may be referred to as prepreg tape 304. As depicted in FIG. 3A, CMC component 300 comprises multiple laminae 302, each derived from an individual prepreg tape 304. Each lamina 302 contains a ceramic fiber reinforcement material 306 encased in a ceramic matrix 308 formed, wholly or in part, by conversion of a ceramic matrix precursor, e.g., during firing and melt infiltration cycles as described more fully below. As portrayed in FIGS. 3A and 3B, reinforcement material 306 is in the form of unidirectional arrays of tows, each containing continuous fibers (filaments) 310. Alternatives to unidirectional arrays of tows may be used as well. Further, suitable fiber diameters, tow diameters, and center-to-center tow spacings will depend on the particular application, the thicknesses of the particular lamina 302 and the tape 304 from which it was formed, and other factors and, therefore, are not represented to scale in FIG. 3A or 3B.

Turning to FIG. 4A, exemplary method 400 for forming CMC component 300 includes forming prepreg tape 304, as shown at 402. As illustrated in FIG. 3B, prepreg tape 304 contains reinforcement material 306 in the form of tows of ceramic fibers 310, which will serve as the reinforcement phase for CMC component 300. Reinforcement material 306 is represented in FIG. 3B as being encased within a solid matrix material 312 formed by, among other things, one or more organic binders and one or more ceramic precursors that will form the ceramic matrix 308 of component 300. Matrix material 312 is formed by applying a slurry composition to reinforcement material 306. Various techniques can be used to apply the slurry composition to reinforcement material 306 and thereby form prepreg tape 304. For example, the slurry composition can be applied directly to a continuous strand of tow as the tow is wound onto a drum; as such, the resultant tape 304 is wound onto the drum.

Further, various binders and precursors can be used to form solid matrix material 312. For example, in the production of SiC/Si-SiC CMC materials, the binder can be chosen to form a carbon char as a result of the firing process, which can then be reacted with molten silicon or a molten silicon alloy during melt infiltration to form additional SiC matrix material. Suitable ceramic precursors for the slurry composition will depend on the composition desired for the ceramic matrix 308 of the component 300. For the above-noted Si-SiC matrix materials used in gas turbine applications, suitable precursors include carbon, and/or one or more other carbon-containing particulate materials. Various other constituents suitable for inclusion in the slurry composition are also known and can be used. As example, the slurry composition may further contain a filler material, such as silicon carbide particles or other ceramic particulate materials that are not converted or otherwise reacted during the firing process. The ceramic precursor and any additional particulate material(s) constitute the solid constituents of the slurry composition, and preferably account for at least 30 to about 60 weight percent of the slurry composition, and more preferably about 35 to about 50 weight percent of the slurry composition.

The balance of the slurry composition is made up of liquid constituents that include at least one organic binder, at least one plasticizer, and at least one solvent in which the binder is dissolved. A preferred binder for use in the slurry composition is polyvinyl butyral (PVB), a commercial example of which is available from Eastman Chemicals under the name BUTVAR® B-79. The preferred PVB binder is preferably present in an amount of at least 5 to about 10 weight percent of the slurry composition, and more preferably about 6 to about 7 weight percent of the slurry composition. Depending on their molecular weight, suitable PVB binders decompose at temperatures higher than temperatures necessary to prepare and debulk the prepreg tape 304 and less than temperatures employed to fire the preform and convert the ceramic precursor to the desired ceramic material of the matrix 308. Other potential candidates for the binder include other polymeric materials such as polycarbonate, polyvinyl acetate and polyvinyl alcohol. The selection of a suitable or preferred binder will depend in part on compatibility with the rest of the slurry components.

In contrast to prior practices in which prepreg tapes often have a solvent content of 10 weight percent or more, tape 304 preferably is limited to a solvent content of less than 10 weight percent, more preferably less than 7 weight percent. To compensate for the limited amount of solvent in the tape 304, which ordinarily is required to produce a flexible prepreg tape, the slurry composition is formulated so that the tape 304 produced therefrom will contain a sufficiently greater amount of the plasticizer capable of conferring the required flexibility of the tape 304.

While solvents commonly used in slurry compositions include toluene and MIBK, these solvents have the disadvantage of posing environmental, safety and health issues as a result of being toxic, necessitating that such slurry compositions and prepreg tapes 304 formed therefrom must be handled in controlled environments. Further, when present in typical amounts of 10 weight percent or more, burn-off of these solvents causes shrinkage that can lead to undesirable dimensional changes in the component 300 relative to stacked plies of prepreg tapes 304 from component 300 is formed as further described below. Though reducing the amount of solvent in the slurry composition to achieve a solvent content of less than 10 weight percent in the tape 304 would address these issues to some extent, an undesired effect is the loss of flexibility in the tape 304 to the degree that the tape 304 may be incapable of being laid-up to produce a preform.

A notable solvent that is suitable for use with the present subject matter is isopropanol ($C_3H_8O$), which in addition to being an effective solvent for the preferred PVB binder, is much less toxic than toluene and MIBK. Further, isopropanol readily evaporates at temperatures used to prepare and debulk the prepreg tape 304, with the result that a slurry composition containing 45 weight percent or more of the solvent can produce a prepreg tape 304 having a solvent content of less than 7 weight percent. Further, solvent emissions during the evaporation of isopropanol from the tape 304 are below levels requiring ventilation, and tapes 304 containing less than 10 weight percent isopropanol can be shipped as non-regulated freight. Other potential candidates for the solvent include ethanol, butanol, and various acetates, which are also less toxic than toluene and MIBK and can be used in the amounts discussed above as being preferred for solvent contents in the slurry composition and tape 304.

As noted above, a sufficient amount of plasticizer is included in the slurry composition to compensate for the relatively low solvent content of the prepreg tape 304 in order to promote the flexibility of the tape 304. For this purpose, the plasticizer is preferably present in the slurry composition in an amount of at least 5 to about 10 weight percent of the composition, and more preferably about 6 to about 7 weight percent of the composition. A suitable plasticizer is triethyleneglycol bis(2-ethyl hexanoate), a commercial example of which is available from Eastman Chemicals under the designation S-2075. In addition to being compatible with the preferred PVB binder, S-2075 is a liquid at room temperature, with the result that this plasticizer is added as a liquid when preparing the slurry composition under room temperature conditions. Further, S-2075 is non-toxic and decomposes at temperatures above 350° C., which is greater than temperatures necessary to prepare and debulk the prepreg tape 304, but less than temperatures employed to fire the preform and convert the ceramic precursor to the desired ceramic material of the matrix 308. Other potential candidates for the plasticizer include phthalates, for example, dibutyl phthalate or butyl benzyl phthalate. However, the toxicity of these plasticizers has not yet been established.

After a slurry composition is prepared to have the above-noted constituents and amounts, the composition can be applied to the reinforcement material 306 by any suitable process. It will be understood, however, that other prepreg tapes and processes for producing such tapes may be used as well.

Referring to FIGS. 3C and 4A, method 400 further may include winding prepreg tape 304 on a drum 314, as shown at 404 in FIG. 4A. To form plies from the prepreg tape 304, pieces 316 of tape 304 may be removed from the tape wound on drum 314, as illustrated in FIG. 3D and at 406 of method 400, and dried, as depicted in FIG. 3E and at 408 of method 400. As shown at 410 in FIG. 4A, the plies 318 of dried prepreg tape may be cut to a size and/or shape for forming CMC component 300. For example, FIG. 3E illustrates that plies 318 may be cut to smaller size plies 318a, 318b, etc. Additionally or alternatively, plies 318 also may be cut to a shape for forming CMC component 300. As an example, although plies 318 are shown schematically as being generally rectangular in shape, plies 318 may be generally oval, trapezoidal, triangular, circular, or any appropriate shape for forming the CMC component. Of course, pieces 316 of wet tape 304 may be cut to an appropriate size and/or shape, i.e., when wet tape 304 is removed from the wound tape on drum 314, the tape may be cut to an appropriate size and/or shape to reduce or eliminate cutting of the plies 318 produced from dried tape 304.

Tape 304 dries through evaporation of the solvent in the slurry composition, yielding prepreg tape 304 comprising reinforcement material 306 embedded in matrix material 312, the latter of which is formed essentially by the ceramic precursor, the binder, the plasticizer, and any particulate filler material, as well as any remaining portion of the solvent that did not evaporate. The pieces of tape 304 may be dried using a variety of techniques. For example, pieces 316 of wet prepreg tape 304 may be exposed to ambient conditions for a sufficient period of time to dry the pieces of tape. A sufficient period of time to dry the tape at ambient conditions may range from about 12 hours to about 24 hours. In an exemplary embodiment, the pieces may be dried at an ambient or room temperature for about 20 hours. As another example, pieces 316 of wet prepreg tape 304 may be exposed to an elevated temperature for a sufficient period of time to dry the pieces of tape. In an exemplary embodiment, the pieces may be dried at a temperature of approximately 50° C. for about two to about three minutes. As such, drying of tape 304 may be accelerated by exposing the tape to a temperature higher than the ambient temperature but less than the temperatures employed to fire the preform and convert the ceramic precursor to the desired ceramic material of matrix 308. Tape 304 is sufficiently dry when it is not wet to the touch, i.e., when no residue is imparted from the tape when it is touched. Also, at low temperatures, e.g., temperatures at or near ambient, dried prepreg tape 304 is not flexible, tacky, or adhesive. As such, dried prepreg tapes 304 are more suitable for manipulation by automated tools or machines, such as robots, than wet tapes because dried tapes will not leave a residue on the tool, stick to the tool, or readily bend in ways that could interfere with the manipulation or positioning of plies formed from the tape.

After obtaining plies 318 of dried prepreg tape 304, the plies may be laid up to define a desired shape or contour of the CMC component preform, such as the CMC blade preform $P_B$ shown in FIG. 2. During the layup generally shown at 412 in FIG. 4A, a desired component shape or contour may be generally defined, which is finally defined after the component preform is processed and machined as needed. The layup step or portion of the process of forming CMC component 300 thus may be referred to as the layup preforming step. The layup performing step may comprise layering multiple plies 318 to form a desired shape or contour of the resultant CMC component 300, e.g., a turbine rotor blade.

Laying up plies 318 of dried prepreg tape 304 may comprise transferring the plies to a layup tool using an automated tool or machine, heating the plies such that the plies may be molded to a desired contour, applying heat to the plies for a period of time, stacking the plies, applying heat to the plies for another period of time, and removing the heat. These steps or portions of method 400 may be repeated as necessary to produce a CMC component preform having the desired shape or contour. As described above, because plies 318 are produced from dried tape 304, one more automated tools or machines such as a robot can be used to lay up the plies to form the CMC component preform. Thus, laying up plies 318 may be an automated process performed by one or more machines rather than a manual process performed by human hands.

In particular, referring to the portion of method 400 illustrated in FIG. 4B, laying up plies 318 includes transferring plies 318 to a layup tool, as shown at 414. More specifically, transferring plies 318 as part of laying up plies 318 of dried tape 304 may include transferring a CMC ply 318 to a layup tool, mandrel, or mold. One or more automated machines 320 can be used to transfer ply 318 to layup tool 322, as shown in FIG. 3F. It will be appreciated that automated machine(s) 320 may include any suitable control system for controlling the features of the machine(s) without deviating from the scope of the present disclosure. For instance, automated machine(s) 320 may have various suitable configurations and/or control circuitries for transferring plies 318 to layup tool 322 or performing any of the various operations described herein. In the schematic depiction of FIG. 3F, for example, automated machine 320 includes an articulable arm 320a and fingers 320b for moving and placing plies 318, but machine 320 may include any suitable features and components for performing the functions described herein.

In one embodiment, automated machine 320 includes a control circuit having one or more processors and associated memory device configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) may generally be configured to store suitable computer-readable instructions that, when implemented by the processor(s), configure the control circuit to perform various functions including, but not limited to, transferring plies 318 to layup tool 322, shaping plies 318, stacking plies 318, or other functions described more fully below. More particularly, the instructions may configure the control circuit to perform functions such as receiving directly or indirectly signals from one or more sensors (e.g. voltage sensors, current sensors, and/or other sensors) indicative of various input conditions, determining a capacitor bank voltage, controlling a pre-charge process of the capacitor bank, and/or various other suitable computer-implemented functions, which enable the automated machine(s) 320 to carry out the various functions described herein. An interface can include one or more circuits, terminals, pins, contacts, conductors, or other components for sending and receiving control signals. Moreover, the control circuit may include a sensor interface (e.g., one or more analog-to-digital converters) to permit signals transmitted from any sensors within the system to be converted into signals that can be understood and processed by the processor(s).

Referring to FIG. 4, heat is applied to the CMC ply 318 to increase the flexibility, as well as the tackiness and adhesiveness, of the ply, e.g., such that the ply may be manipulated into the CMC component preform shape. As previously described, at lower temperatures, plies 318 of dried prepreg tape 304 generally are not flexible, tacky, or adhesive, and as such, plies 318 do not readily bend or stick to one another or to objects that come in contact with the plies. However, as their temperature is increased, plies 318 of dried prepreg tape 304 become more flexible and tacky, such that, e.g., the plies can be bent and tacked to one another. As such, as shown at 416 in FIG. 4B, heat may be applied to ply 318 to increase the flexibility, tackiness, and/or adhesiveness of the ply. In one embodiment, layup tool 322 may be heated such that when plies 318 are transferred to layup tool 322, heat is applied to the plies via tool 322.

As heat is applied to CMC ply 318, force may be applied to the ply to mold, shape, or bend the ply into the desired CMC component preform shape, as illustrated at 418 of method 400. For example, automated machine 320 may apply force to ply 318 to mold the ply shape to the desired contour. In one embodiment, machine 320 may mold a plurality of plies 318 to follow the contours of layup tool 322, as shown in FIG. 3F. That is, layup tool 322 may be shaped such that, when a plurality of plies 318 are bent or molded to conform to the contours of layup tool 322, the plies 318 are molded into the shape required for the CMC component preform. Automated machine 320 used to shape or mold the one or more plies 318 may be the same machine used to transfer ply 318 to layup tool 322 or machine 320 used to shape plies 318 may be a different machine, i.e., a first machine may be used to transfer the ply and a second machine may be used to shape the one or more plies. Alternatively or additionally, multiple automated machines 320 may be used to mold, shape, or bend each ply 318 into a desired shape. In other embodiments, each ply 318 of the CMC component preform may be molded, shaped, or bent in other ways and into other shapes.

Referring to 420 in FIG. 4B, after CMC ply 318 is molded to the desired contour, the ply may be heated for a first period of time. In one embodiment, in which ply 318 is shaped or molded on a heated layup tool 322, the molded ply 318 may remain on tool 322 for the first period of time. In such embodiments, layup tool 322 may be heated to a specified temperature, which may be determined based on the first period of time as well as the degree of flexibility, tackiness, and/or adhesiveness of the plies at that temperature and whether the plies are covered or uncovered as they are heated for the first period of time. In an example embodiment, layup tool 322 is heated to approximately 120° C., ply 318 on tool 322 is covered, and the first period of time is about 20 minutes. That is, the ply 318 is covered and heated on layup tool 322 at approximately 120° C. for about 20 minutes. The plies may be covered with, for example, shrink wrap or another appropriate material. In other embodiments, heat may be applied to ply 318 by other sources and/or at other temperatures, and the first period of time may have other values. In still other embodiments, ply 318 may be uncovered (i.e., not covered) as it is heated for the first period of time.

As shown at 422 in FIG. 4B, laying up plies 318 may further include stacking CMC ply 318 with at least one other CMC ply, e.g., to form a component preform such as CMC blade preform $P_B$. As illustrated in FIG. 3G, automated machine 320 may automatically stack ply 318 with at least one other CMC ply, and the stacked plies may, at least in part, define a desired shape or contour of the component preform. As an example, automated machine 320 may stack a CMC ply 318 within at least one other CMC ply 318 such that CMC plies 318 may be positioned one atop another. These stacked plies 318 may define the shape or contour of the component preform or may be stacked with previously stacked plies to define the shape or contour of the component preform. As they are stacked, plies 318 may be aligned or positioned with respect to one another in any appropriate configuration for defining the shape or contour of the component preform. Automated machine 320 used to stack ply 318 may be the same machine used to transfer ply 318 to layup tool 322 and/or the same machine used to shape or mold ply 318, or machine 320 used to stack ply 318 with at least one other ply may be a different machine. For example, a first machine may be used to transfer the ply, a second machine may be used to shape/mold the ply, and a third machine may be used to stack the ply. As another example, a first machine may be used to transfer the ply, a second machine may be used to shape/mold the ply, and the first machine may be used to stack the ply. Of course, other combinations of automated machines may be used to transfer, shape/mold, and stack the ply, and as stated, in some embodiments transferring, shaping/molding, and stacking may be performed by the same machine 320.

After ply 318 is stacked with at least one other ply 318, as shown at 424, the stacked plies 318 may be heated for a second period of time. In one embodiment, in which plies 318 are stacked on a heated layup tool 322, the stacked plies 318 may remain on tool 322 for the second period of time. In such embodiments, layup tool 322 may be heated to a specified temperature, which may be determined based on the second period of time as well as the degree of flexibility, tackiness, and/or adhesiveness of the plies at that temperature and whether the plies are covered or uncovered as they are heated for the second period of time. In an example embodiment, layup tool 322 is heated to approximately 120° C., stacked plies 318 on tool 322 are covered, and the second period of time is about 30 minutes. That is, stacked plies 318 are covered and heated on layup tool 322 at approximately 120° C. for about 30 minutes. The plies may be covered with, for example, shrink wrap or another appropriate material. In other embodiments, heat may be applied to stacked plies 318 by other sources and/or at other temperatures, and the second period of time may have other values. In still other embodiments, plies 318 may be uncovered (i.e., not covered) as they are heated for the second period of time.

Then, as shown at 426 in FIG. 4B, the heat may be removed or reduced such that the flexibility, tackiness, and/or adhesiveness of plies 318 is reduced. Laying up plies 318 also may include, as shown at 428, repeating the steps or portions of method 400 in which plies 318 are transferred to the layup tool, heated, shaped/molded, heated for a first period of time, stacked, and heated for a second period of time before the heat is removed or reduced. Alternatively, before removing or reducing the heat applied to plies 318, method 400 may return to transferring the ply 318, generally represented at 414 in FIG. 4B, and repeat the steps of transferring, applying heat, shaping, heating for the first period of time, stacking, and heating for the second period of time. Further, it will be appreciated that transferring, applying heat, shaping, heating for the first period of time, stacking, heating for the second period of time may be repeated any number of times to define the shape or contour of the CMC component preform. Moreover, as the steps are repeated, it will be understood that stacking ply 318 with at least one other ply 318 includes stacking ply 318 with previously stacked plies 318, e.g., ply 318 is stacked with at least one other ply then, as the steps are repeated, another ply 318 is stacked with the ply 318 that was previously stacked with the at least one other ply.

In one example embodiment, where the CMC component preform is a CMC blade preform $P_B$ as illustrated in FIG. 2, the steps of transferring, applying heat, shaping, heating for the first period of time, stacking, and heating for the second period of time may be performed to layup the airfoil plies 80, then repeated to layup the dovetail plies 82, and repeated again to layup the platform plies 84. FIG. 3H schematically illustrates blade preform $P_B$ where airfoil plies 80 and dovetail plies 82 have been laid up, and automated machine 320 is transferring a platform ply 84 to layup tool 322. Further, as described, the heat applied to the plies may be removed or reduced before method 400 returns to transferring plies to layup tool 322 or the heat may be removed or reduced only after all the plies required to form the CMC component preform have been laid up. In some embodiments, the heat is removed between laying up some, but not all, of the plies. For example, in forming the CMC blade preform $P_B$, the heat may be reduced or removed after the airfoil plies 80 are laid up but not reduced or removed after the dovetail plies 82 are laid up.

Further, it will be appreciated that, although generally described with respect to a ply 318, transferring CMC ply 318 may comprise transferring a plurality of CMC plies 318 to layup tool 322. Similarly, applying heat to ply 318 may comprise applying heat to the plurality of plies 318. Further, heating ply 318 for the first period of time may comprise heating the plurality of plies 318 for the first period of time. Additionally, shaping ply 318 may comprise shaping the plurality of plies 318. Moreover, heating ply 318 for the second period of time may comprise heating the plurality of plies 318 for the second period of time. Also, stacking ply 318 may comprise stacking the plurality of plies 318.

Returning to FIG. 4A, after plies 318 are laid up to define the shape or contour of the CMC component preform, the plies are processed as shown at 430 to form the CMC component preform. For example, as schematically illustrated in FIG. 3I, the plies are debulked, i.e., exposed to elevated temperatures and elevated pressures in an autoclave 324, to form the CMC component preform 326. The debulking temperature is below the decomposition temperature of the binder and plasticizer of the slurry composition of tape 304 from which plies 318 are made. Next, as shown at 432 in FIG. 4A, the CMC component preform may undergo a burn-off or firing cycle, i.e., a burn-off/firing of the CMC preform may be performed. In an example burn-off/firing, the preform is heated in a vacuum or in an inert atmosphere to decompose the binders in the slurry composition of tape 304 used to produce plies 318 and to convert the ceramic matrix precursor into the ceramic material of the matrix 308 of the CMC component 300. Thus, the firing temperature is greater than the debulking temperature.

Then, as illustrated at 434, the CMC component 300 may be subjected to one or more post-processing cycles for densification of the preform airfoil, e.g., after processing the component, the CMC component 300 may be densified. Densification may be performed using any known densification technique including, but not limited to, Silcomp, melt infiltration (MI), chemical vapor infiltration (CVI), polymer infiltration and pyrolysis (PIP), and oxide/oxide processes. As an example, densification can be conducted in a vacuum furnace having an established atmosphere at temperatures above 1200° C. to allow silicon or other materials to melt-infiltrate into the preform component and thereby fill any porosity created with matrix 308 as a result of the decomposition of the binder during burn-off/firing.

Further, the CMC component 300 may be finish machined, if and as needed, as shown at 436. Finish machining may define the final finished shape or contour of the CMC component. For example, as depicted in FIG. 3J, where the CMC component is a CMC rotor blade 74, the blade 74 may be machined to define the final shape or contour of the airfoil portion 90, dovetail portion 92, and platform portion 94 of the blade. Additionally, an environmental barrier coating (EBC) may be applied to the CMC component.

Method 400 is provided by way of example only; it will be appreciated that some steps or portions of method 400 may be performed in another order or may be omitted. Additionally, in various embodiments of method 400, other techniques may be used to dry tape 304 and/or other processing, burn-off/firing, or post-processing cycles may be used. Moreover, it will be appreciated that tape 304 may be formed from any appropriate reinforcement material, precursor, binder, plasticizer, and solvent that can be dried to produce plies of dried prepreg tape as described herein. As such, specific processing techniques and parameters for the above process will depend on the particular composition of the materials and are otherwise within the capabilities of those skilled in the art and, therefore, are not discussed in great detail here.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for forming a ceramic matrix composite (CMC) component, the method comprising:
    forming pieces of a pre-impregnated CMC tape;
    drying the pieces of the pre-impregnated CMC tape to produce CMC plies; and
    automatically laying up the CMC plies, wherein laying up the CMC plies includes transferring a CMC ply to a layup tool;
        applying heat to the CMC ply via the layup tool and molding the CMC ply to a desired contour;
        heating the molded CMC ply for a first period of time in a covered state, to increase flexibility, tackiness, and adhesiveness of the molded CMC ply, wherein the molded CMC ply is heated via the layup tool;
        stacking the molded CMC ply with at least one other CMC ply; and
        heating the stacked CMC plies via the layup tool for a second period of time in a covered state, to increase the flexibility, tackiness, and adhesiveness of the stacked CMC plies.

2. The method of claim 1, wherein covering the molded CMC ply for the first period of time and covering the stacked CMC plies for the second period of time is by a shrink wrap.

3. The method of claim 1, wherein the first period of time is up to about 20 minutes.

4. The method of claim 1, wherein the second period of time is up to about 30 minutes.

5. The method of claim 1, further comprising, after heating the stacked CMC plies for the second period of time, removing the heat from the stacked CMC plies.

6. The method of claim 1, wherein transferring the CMC ply to the layup tool comprises transferring a plurality of CMC plies to the layup tool, wherein applying heat to the CMC ply comprises applying heat to the plurality of CMC plies, and wherein stacking the molded CMC ply comprises stacking the plurality of CMC plies.

7. The method of claim 1, further comprising, while applying heat to the CMC ply, molding the CMC ply to the desired contour.

8. The method of claim 7, wherein an automated machine molds the CMC ply to the desired contour.

9. The method of claim 1, wherein an automated machine transfers the CMC ply to the layup tool.

10. The method of claim 1, wherein an automated machine stacks the molded CMC ply with the at least one other CMC ply.

11. The method of claim 1, further comprising, after stacking the molded CMC ply with at least one other CMC ply, repeating transferring a CMC ply to the layup tool, applying heat to the CMC ply, and stacking the CMC ply with at least one other CMC ply.

12. The method of claim 11, wherein, as transferring, applying, and stacking are repeated, stacking the CMC ply with at least one other CMC ply includes stacking the CMC ply with previously stacked CMC plies.

13. The method of claim 11, wherein transferring a CMC ply to the layup tool, applying heat to the CMC ply, and stacking the CMC ply with at least one other CMC ply are repeated until a component preform is formed.

14. The method of claim 13, further comprising processing the component preform in an autoclave at an elevated temperature and an elevated pressure.

15. The method of claim 14, further comprising densifying the component preform.

16. A method for forming a ceramic matrix composite (CMC) component, the method comprising:
laying up CMC plies using an automated machine, wherein laying up CMC plies includes transferring a CMC ply to a layup tool;
applying heat to the CMC ply via the layup tool and molding the CMC ply to a desired contour;
heating the molded CMC ply for a first period of time in a covered state, to increase flexibility, tackiness, and adhesiveness of the molded CMC ply, wherein the molded CMC ply is heated via the layup tool;
stacking the molded CMC ply with at least one other CMC ply; and
heating the stacked CMC plies via the layup tool for a second period of time in a covered state, to increase the flexibility, tackiness, and adhesiveness of the stacked CMC plies,
wherein the CMC plies are formed from a pre-impregnated CMC tape.

17. The method of claim 16, wherein the CMC plies are formed from a dried pre-impregnated CMC tape.

18. The method of claim 16, wherein transferring a CMC ply to the layup tool, applying heat to the CMC ply and molding, covering and heating the molded CMC ply for the first period of time, stacking the molded CMC ply with at least one other CMC ply, and covering and heating the stacked CMC plies for the second period of time are repeated until a component preform is formed.

19. A method for forming a ceramic matrix composite (CMC) component, the method comprising:
forming CMC plies from pre-impregnated CMC tape and laying up the CMC plies, wherein laying up the CMC plies includes
transferring a CMC ply to a layup tool using an automated machine;
applying heat to the CMC ply via the layup tool and molding the CMC ply to a desired contour;
heating the molded CMC ply for a first period of time in a covered state, to increase flexibility, tackiness, and adhesiveness of the molded CMC ply, wherein the molded CMC ply is heated via the layup tool;
stacking the molded CMC ply with at least one other CMC ply using the automated machine; and
heating the stacked CMC plies via the layup tool for a second period of time in a covered state, to increase the flexibility, tackiness, and adhesiveness of the stacked CMC plies.

20. The method of claim 19, wherein forming the CMC plies comprises:
forming the pre-impregnated CMC tape;
winding the pre-impregnated CMC tape on a drum;
removing pieces of the pre-impregnated CMC tape from the drum;
drying the pieces of removed pre-impregnated CMC tape to form the CMC plies,
wherein the CMC plies are dried pieces of the pre-impregnated CMC tape.

* * * * *